April 7, 1931. W. E. SANGER ET AL 1,799,481
APPARATUS FOR EXTRACTING SOLUBLE SUBSTANCES
Filed May 9, 1923
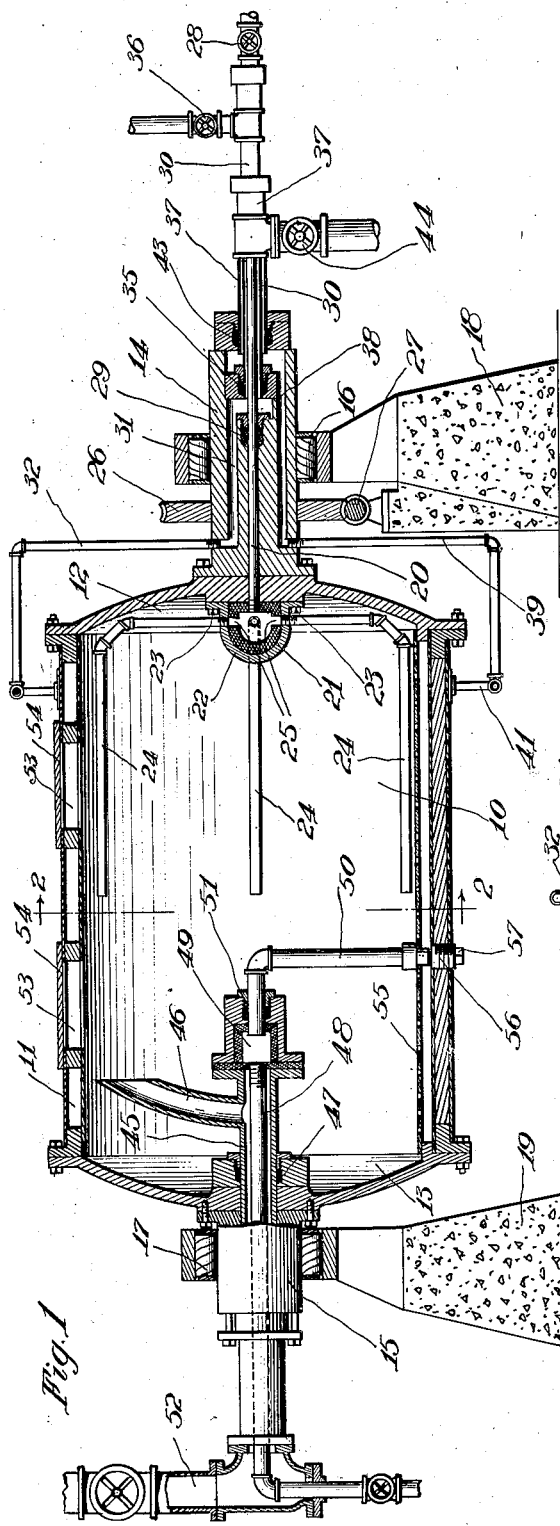
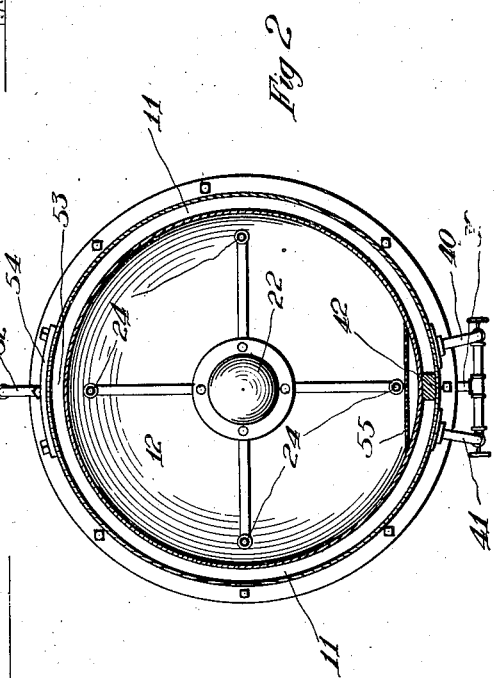

Patented Apr. 7, 1931

1,799,481

UNITED STATES PATENT OFFICE

WALTER E. SANGER AND OSCAR H. WURSTER, OF CHICAGO, ILLINOIS; UNION TRUST COMPANY, OF DETROIT, MICHIGAN, EXECUTOR OF THE SAID WALTER E. SANGER, DECEASED, ASSIGNOR TO SAID WURSTER

APPARATUS FOR EXTRACTING SOLUBLE SUBSTANCES

Application filed May 9, 1923. Serial No. 637,713.

This invention relates to the extraction of substances, such as animal and vegetable fats and oils from the material in which they are found, by means of various suitable solvents, such as benzol or carbon tetrachloride.

This invention has for its object the provision of an improved apparatus by which extraction by means of a solvent may be efficiently, conveniently, and economically accomplished.

The invention is exemplified in the combination and arrangement of parts shown in the accompanying drawing and described in the following specification and in the steps of the process therein set forth.

In the drawing—

Fig. 1 is a vertical sectional view through the longitudinal center of one form of apparatus comprised in the present invention; and Fig. 2 is a vertical section substantially on line 2—2 of Fig. 1.

The apparatus shown in the drawing comprises a rotary extractor 10 having a surrounding jacket 11 for the admission of temperature controlling fluid. The ends of the extractor 10 are provided with detachable heads 12 and 13 to which are secured cylinders 14 and 15, respectively, journaled in roller bearings 16 and 17 mounted on pedestals 18 and 19.

The cylinder 14 is centrally bored to receive a pipe 20 which communicates with a distributing valve head 21 mounted within a casing 22 which is secured to the inner face of the cylinder head 12 by cap screws 23. A series of pipes 24 are threaded into openings in the casing 22 which rotates about the head 21 so that the openings 25 register with openings 25 in the head 21 for certain positions of the extractor 10.

The cylinder 14 and the extractor 10 are rotatable by means of a worm wheel 26 driven by a worm 27 and the rotation of the extractor carries with it the pipes 24, thus periodically bringing the inner ends of the pipes into registration with the openings 25. A valve 28 controls the pipe 20 leading to the distributing valve head 21 so that steam may be admitted to the distributing head, as will be hereinafter described. A suitable packing gland 29 provides a tight joint between the pipe 20 and the cylinder 14 so that the cylinder may rotate about the pipe while maintaining a fluid-tight joint therewith.

A second pipe 30 surrounds the pipe 20 and communicates with a passage 31 in the cylinder 14, the passage 31 being connected by a pipe 32 to the jacket 11 surrounding the extractor. A packing gland 35 forms a tight joint between the cylinder 14 and the pipe 30. A valve 36 controls the admission of steam through the pipe 30 to the jacket surrounding the extractor. A third pipe 37 surrounds the pipe 30 and communicates through a passage 38 and pipe 39 with branch pipes 40 and 41 which connect with the jacket 11 on opposite sides of a partition wall 42 which extends the full length of the jacket and is shown as located diametrically opposite the point at which the pipe 32 enters the jacket, although this relative position is not essential. It will be apparent that when the extractor is rotated, water of condensation will collect at one side or the other of the partition 42, depending on the angular position of the extractor, and this water will be drained through one or the other of the branch pipes 40 and 41, depending on the direction of rotation, the pipes being controlled by valves, as shown. A packing gland 43 and a control valve 44 are provided for the pipe 37.

The cylinder 15 is centrally bored for the passage of a pipe 45 provided with a pipe 46 arranged within the extractor 10 and opening near the upper portion thereof for receiving gases or vaporized material from the extractor. A packing gland 47 provides a tight joint between the head 13 and the pipe 45 and permits relative rotation thereof. A packing gland 47' provides a tight joint between the rotary cylinder 15 and the stationary pipe 45. A second pipe 48 passes through the journal 15 within the pipe 45 and communicates with a head 49 which is provided with a pipe 50 rotatably mounted therein and provided with a packing gland 51. The pipe 50 extends through the screen 55 and opens near the bottom of the extractor when the extractor is in the position shown in Fig. 1.

The pipe may be provided with a collar resting on the upper surface of the screen.

The pipe 45 communicates through a conduit 52 to suitable condensing and separating apparatus; and the pipe 48 is connected to suitable pumping mechanism by which solvent material may be introduced and exhausted from the interior of the extractor. Openings 53 having covers 54 are provided for charging the extractor with material to be treated.

Heretofore in the extraction of fats or oils as has been customary where the material contains a comparatively large percentage of moisture to dry the material prior to the extracting operation, but according to the present invention fats or oils may be extracted from material having as high as 50% or more of moisture without preliminary drying. If the material, such as bones, seeds, and pressed-cake, etc., is dry, or nearly so, the extractor is charged with the material through the openings 53 and the closures 54 are tightly sealed. The solvent is then introduced into the extractor through the pipes 48 and 50 so as to flood the material within the extractor. The extractor is then rotated to agitate together the material and solvent, after which the solution is pumped out through the pipes 48 and 50.

A filter plate 55 is provided near the bottom of the extractor to separate the solution from the solid material when the tank is in the position shown in Fig. 1. The partition 42 may have an opening 56 extending therethrough from the interior to the exterior of the extractor through which the solution may be drawn from beneath the filter plate 55 instead of being removed through the pipe 50. A plug 57 or other suitable means may be used for closing the opening 56. After the removal of the solution the material may again be flooded with fresh solvent and more of the soluble element be thus extracted. The operation may be repeated any number of times, using fresh solvent or solvent which has been previously used until the material has been extracted to the desired extent.

After the final extraction there remains in the extractor the material, such as bones, seeds, meal, etc., with solvent adhering thereto and disposed in the pores with possibly some moisture. To remove this remaining solvent the material may be heated by steam introduced into the jacket 11 while the extractor is rotated to bring all parts of the material into contact with the heated walls of the extractor. At the same time, if desired, steam may be introduced into the pipe 20 so that during rotation this steam will be periodically discharged into the extractor through the pipes 24 to drive off all traces of the solvent.

In case the material from which oil or fat is to be extracted contains a considerable quantity of moisture, as for example, green bone in which the moisture may amount to from 40% to 60%, the material is charged into the extractor without previous drying and flooded with the solvent. Steam is then introduced into the jacket to heat the entire contents and the extractor is rotated to facilitate the heating operation. Solvent vapors together with water vapors pass off from the extractor through the pipe 46 and conduit 52 to suitable condensers and separators where the condensed water and solvent are separated from one another and the solvent collected for further use. The operation may, of course, be carried on with the extractor stationary or during rotation of the extractor to facilitate heating. The pressure within the extractor may be reduced to facilitate evaporation by means of a suction pump connected with the conduit 52, or, the process may be performed at atmospheric pressure or at a pressure in excess of atmospheric pressure. The solution consisting of the solvent and extracted fat or oil may be removed and the process repeated any number of times found necessary or desirable for removing the fatty material to the degree required.

After the final extraction the remaining solvent may be removed, as previously explained.

The presence of the solvent during the time that the material is heated assists in the removal of moisture, advantage being taken of the well-known principles of physical chemistry governing the vapor pressure and boiling points of mixtures. By using a solvent which for practical purposes is immiscible with water, a condition is brought about under which at a given pressure the mixture will boil at a lower temperature than the boiling point either of the solvent or water alone, since the vapor pressures of the two constituents summate and overcome the pressure on the mixture at a temperature lower than that at which the lowest boiling constituent alone would overcome the pressure, thus facilitating the removal of both water and the solvent from the material.

The drying and extracting as carried out by the present invention is effected without injury to the fat or oil or to the material from which it is extracted. The operation may be carried out under vacuum, permitting the use of low temperatures. The heating surface is large so that it is not necessary to use excessive temperatures at any point to quickly warm the entire contents of the extractor. The heat from the steam jacket is transmitted to the material by means of the solvent and solvent vapor, giving uniform and quick distribution of the heat, which is further enhanced by the rotation of the extractor.

The solvent is introduced into the extracting chamber below the screen 55 by means of the pipes 48 and 50, the material from which the oils and fats are to be extracted being previously introduced into the extractor through the openings 53. The extractor is then rotated to agitate the material and solvent after which the solution is pumped out of the extractor through the pipes 48 and 50. This operation may be repeated several times, using fresh solvent each time the operation is performed.

After the final extraction some of the solvent is still in intimate contact with the bones, seeds, etc., within the extractor. In order to remove the solvent steam may be introduced into the jacket 11 while the extractor is rotated to bring all parts of the material into contact with the heated walls of the extractor. Steam may also be introduced into the extractor through the pipes 24 to drive off all traces of the solvent through the member 46 and pipes 45 and 52. This latter process is also used where the material has considerable moisture, the water vapor and solvent passing off through the pipes 46 and 52 into suitable condensers and separators.

Pipes 32 supply steam to the steam jacket and pipes 39 remove any water of condensation from said steam jacket after it has been intercepted by the baffle 42, the steam pressure in the jacket tending to blow the water out through the pipe extensions 40 or 41 and pipe 39 when valve 44 is opened.

We claim:

1. An extractor comprising a rotary container having a surrounding jacket, a partition wall in said jacket extending in the direction of the axis of said container, and condensation drains communicating with said jacket adjacent the opposite sides of said partition wall.

2. An extractor comprising a cylindrical container having a surrounding jacket, and a partition wall in said jacket extending longitudinally of said container, said partition wall having an opening extending therethrough from the interior to the exterior of said container.

3. An extractor comprising a cylindrical container having a surrounding jacket and having charging doors extending through the walls thereof, removable heads for closing the ends of said cylindrical container, journals connected with said heads for supporting said container, conduits extending through one of said journals and communicating with said jacket at points on different sides thereof for supplying steam and for removing condensed moisture from said jacket respectively, a distributing head within said container, a third conduit extending through said journal and communicating with said distributing head, a rotary valve cooperating with said head for periodically discharging steam from said distributing conduit into said container when said container is rotated, and means for driving said container.

4. An extractor comprisng a cylindrical container having a surrounding jacket, journals fixed to said container for supporting said container, means for rotating said container, means for supplying a heating medium to said jacket and for draining liquid from said jacket during rotation of said container, means for periodically supplying steam to the interior of said container during rotation thereof, a conduit extending through one of said journals for supplying a solvent to said container and for withdrawing the solution formed by said solvent, and a second conduit extending through said journals and disposed about said first-mentioned conduit, said second conduit having an intake opening disposed adjacent the upper portion of said container.

5. An extractor comprising a rotary container having a surrounding jacket, a partition wall in said jacket extending in the direction of the axis of said container, a steam conduit communicating with said jacket, condensation drains communicating with said jacket adjacent the opposite sides of said partition wall, and valves for controlling said drains.

6. An extractor comprising a rotary container having a surrounding jacket, a partition wall in said jacket extending in the direction of the axis of said container, a steam conduit communicating with said jacket, and a condensation drain connecting with said jacket at one side of said partition wall.

7. An extractor comprising a rotary container having a surrounding jacket, journals for supporting said container, bearings in which said journals rotate, and a pair of conduits extending into one of said bearings, said conduits being arranged one within the other, one of said conduits communicating with said jacket at points on different sides of the axis of rotation of said container for supplying a heating medium and for draining liquid of condensation from said jacket.

8. An extractor comprising a cylindrical container having a surrounding jacket, a partition wall in said jacket extending longitudinally of said container, and a filter plate extending longitudinally of and parallel to the axis of rotation of said container, thereby separating a portion of said container from the main body thereof, said partition wall having an opening extending therethrough for draining material from the portion of said container divided off by said filter plate.

9. An extractor comprising a rotary container having a jacketing chamber, a steam conduit communicating with said chamber, a baffle arranged in said chamber adapted to intercept the water of condensation, and an outlet conduit through which the water is drained from said chamber, said baffle being arranged with a portion thereof adjacent said outlet so as to pile up the intercepted water over said outlets so that said water will drain readily into said conduit.

In testimony whereof we have signed our names to this specification on this 5th day of May, A. D. 1923.

WALTER E. SANGER.
OSCAR H. WURSTER.